United States Patent [19]

Yoshizawa

[11] Patent Number: 4,678,495
[45] Date of Patent: Jul. 7, 1987

[54] GLASS SHAPING MOLD
[75] Inventor: Hideo Yoshizawa, Kanagawa, Japan
[73] Assignee: Nippon Sheet Glass Co., Ltd., Japan
[21] Appl. No.: 801,786
[22] Filed: Nov. 26, 1985
[30] Foreign Application Priority Data Nov. 26, 1984 [JP] Japan .................... 59-248967

[51] Int. Cl.$^4$ ............................ C03B 11/08
[52] U.S. Cl. ...................... 65/287; 65/106; 65/273; 65/374.11; 65/374.13
[58] Field of Search .......... 65/106, 273, 287, 374.11, 65/374.13

[56] References Cited

U.S. PATENT DOCUMENTS 3,328,151 6/1967 Richardson .............. 65/287
3,506,430 4/1970 Oelke et al. ............. 65/374.11
4,246,313 1/1981 Stengle, Jr. ............. 65/374.11
4,511,386 4/1985 Kellar et al. ............. 65/287 X

OTHER PUBLICATIONS

Thermotex, Ichikawa Woolen Textile Company, Ltd., Japan, Catalogue, "High Heat Resisting Pads for the Process Following the Aluminum Extruding.

Primary Examiner—Arthur Kellogg
Attorney, Agent, or Firm—Lowe, Price, Leblanc, Becker & Shur

[57] ABSTRACT

A glass shaping mold includes a female mold member having a shaping surface, a male mold member having a shaping surface complementary to the shaping surface of the female mold member, and a felt sheet disposed on each of the shaping surfaces. The female and male mold members are movable toward each other to shape a heat-softened glass object between the felt sheets on the shaping surfaces.

21 Claims, 5 Drawing Figures 4,678,495

GLASS SHAPING MOLD

BACKGROUND OF THE INVENTION

The present invention relates to a glass shaping mold for imparting a desired shape to a heat-softened glass sheet or gob.

Heat-softened glass sheets or gobs have conventionally been shaped by glass shaping molds. When bending a heat-softened glass sheet in direct contact with the shaping surfaces of shaping molds, the glass sheet tends to stick partially to the shaping surfaces or be locally cooled by the shaping surfaces, resulting in the likelihood of producing certain optical defects in the glass sheet.

One solution has been to apply a cover of flexible fiber glass cloth against the shaping surface of a bending mold for preventing the glass sheet from sticking to the shaping surface and providing heat insulation between the shaping surface and the glass sheet, as disclosed in U.S. Pat. No. 4,274,857 to Wolfe. However, the fiber glass cloth cover is liable to leave cloth marks on the surface of the bent glass sheet. The bent glass sheet therefore has small surface irregularities which are responsible for optical defects such as light transmitting and reflecting distortions. The glass surface irregularities could be reduced by employing thinner glass fibers for the fiber glass cloth cover. The fiber glass cloth cover would however become less durable and might be broken in use. If the fiber glass cloth cover were broken, the glass surface would have large irregularities and the fiber glass cloth cover would be unraveled progressively from the broken region.

It would be difficult to increase the thickness of the fiber glass cloth cover. Where the fiber glass cloth cover is applied to the bending mold surface, the cloth cover is gradually burned away and reduced in thickness in use. Consequently, the fiber glass cloth cover is required to be replaced at frequent intervals.

SUMMARY OF THE INVENTION

It is an object of the present invention to provide a glass shaping mold capable of forming glass products free of optical defects such as light transmitting and reflecting distortions.

According to the present invention, there is provided a glass shaping mold comprising a female mold member having a shaping surface, a male mold member having a shaping surface complementary to the shaping surface of the female mold member, and a felt sheet disposed on each of the shaping surfaces, the female and male mold members being movable toward each other to shape a heat-softened glass object between the felt sheets on the shaping surfaces.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
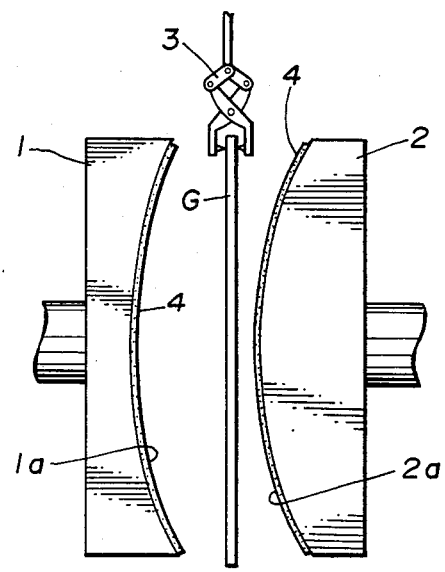
FIG. 1 is a front elevational view of a vertical glass shaping mold according to a first embodiment of the present invention.

FIG. 1 shows a glass shaping mold constructed as a vertical press bending mold. The vertical press bending mold generally comprises a pair of female and male mold members 1, 2 spaced horizontally from each other and movable toward each other. A glass sheet G which has been heat-softened by a heating furnace is vertically gripped by a pair of tongs 3 between the female and male mold members 1, 2. Then, the female and male mold members 1, 2 are brought together to bend the glass sheet G to a shape imparted by complementary shaping surfaces 1a, 2a of the female and male mold members 1, 2, respectively.

Figure 2:
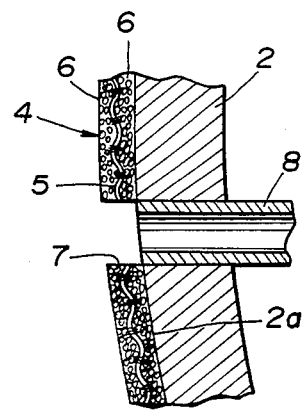
FIG. 2 is an enlarged fragmentary cross-sectional view of a male mold member of the glass shaping mold shown in FIG. 1.

A felt sheet 4 is applied to each of the shaping surfaces 1a, 2a. As shown in FIG. 2, the felt sheet 4 on the shaping surface 2a comprises a core cloth layer 5 and a pair of fiber layers 6 disposed one on each side of the core cloth layer 5. The felt sheet 4 has a hole 7 defined therethrough and communicating with a cooling nozzle 8 mounted on the male mold member 2. The sheet 4 may comprise only one fiber layer 6 on one surface of the core cloth layer 5, or may comprise a fiber layer without the core cloth layer therein. The cooling nozzle 8 may be fixed to the male mold member 2 or may have its distal end movable beyond the surface of the felt sheet 4 under air pressure when cooling air is ejected from the cooling nozzle 8. The felt sheet 4 on the shaping surface 1a is constructed in the same manner.

The felt sheet 4 can be manufactured by needling the fiber layers 6 on the core cloth layer 5 to cause the fibers to be intertwined with the fibers of the core cloth layer 5, or by needling a web of fibers without the core cloth layer 5 therein to intertwine the fibers. The hole 7 is formed by punching. After the hole 7 has been punched out, the felt sheet 4 is heat pressed to smooth its surfaces. The core cloth layer 5 may comprise glass fibers, aramid fibers, steel fibers, polyester fibers, nylon fibers, or the like, or a combination of these fibers. Each of the fiber layers 6 may comprise aramid fibers, carbon fibers, steel fibers, silica fibers, alumina fibers, asbestos fibers, or other heat-resistant, mechanically strong fibers, or a combination of these fibers.

One preferred example of the felt sheet 4 is as follows: The core cloth layer 5 is made of aramid fibers only or a mixture of aramid and carbon fibers, and the fiber layer 6 is made of steel fibers. Where aramid and carbon fibers are employed, the aramid fibers should be in the range of from 10 to 50 weight percent and the carbon fibers should be in the range of from 50 to 90 weight percent. Where steel, aramid, and carbon fibers are employed, the steel fibers should range from 50 to 80 weight percent, the carbon fibers should range from 10 to 40 weight percent, and the aramid fibers should range from 2 to 25 weight percent. The fibers of the fiber layer 6 should be of a diameter ranging from 2 to 18 microns, preferably about 10 microns. The overall thickness of the felt sheet 4 should preferably range from 3 to 10 mm to provide desired contact between the glass sheet G and the mold surfaces 1a, 2a. If the thickness of the felt sheet 4 were less than 3 mm, then the felt sheet 4 would be of a shortened service life. If the thickness of the felt sheet 4 were larger than 10 mm, then the hole 7 would not easily be formed therein.

The mold shown in FIGS. 1 and 2 is capable of quenching and tempering the glass sheet G by air or water fed from the cooling nozzle 8 immediately after the glass sheet G has been press bent. However, the cooling nozzle 8 may be dispensed with, and the mold may be used only to press bend the glass sheet G. Where the felt sheet 4 is made of a material or materials permeable to air or water, the hole 7 may be dispensed with, and cooling air or water may be applied from the cooling nozzle 8 through the felt sheet 4 against the glass sheet G. With such an arrangement, cooling air or water can be applied uniformly against the surfaces of the glass sheet G.

Figure 3:
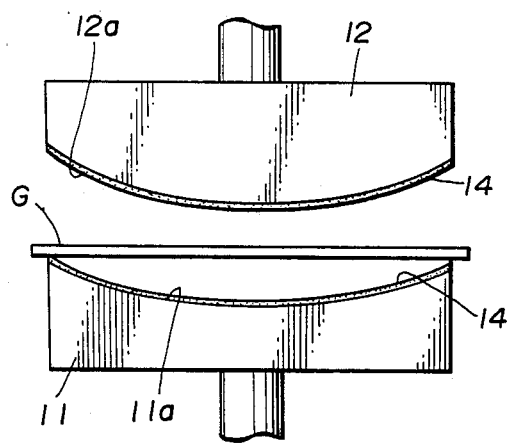
FIG. 3 is a front elevational view of a horizontal glass shaping mold according to a second embodiment of the present invention.

FIG. 3 shows a horizontal press bending mold according to a second embodiment of the present invention. The horizontal press bending mold generally comprises a pair of female and male mold members 11, 12 spaced vertically from each other and movable toward each other. A glass sheet G which has been heat-softened by a heating furnace is horizontally bed by conveyor rollers (not shown) between the female and male mold members 11, 12. Then, the female and male mold members 11, 12 are brought together to bend the glass sheet G to a shape imparted by complementary shaping surfaces 11a, 12a of the female and male mold members 11, 12, respectively.

Figure 4:
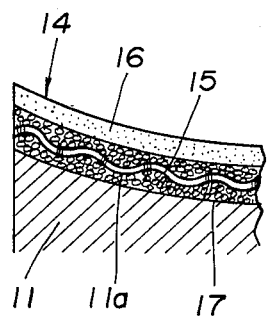
FIG. 4 is an enlarged fragmentary cross-sectional view of a female mold member of the glass shaping mold shown in FIG. 3.

A felt sheet 14 is applied to each of the shaping surfaces 11a, 12a. As shown in FIG. 4, the felt sheet 14 on the shaping surface 11a comprises a core cloth layer 15, a pair of fiber layers 17 disposed one on each side of the core cloth layer 15, and a fiber layer 16 disposed on one of the fiber layers 17 remotely from the shaping surface 11a for contact with the glass sheet G. The fiber layer 16 may mainly comprise highly heat-resistant fibers such as steel fibers, and the fiber layer 17 held against the shaping surface 11a may mainly comprise highly mechanically strong fibers such as aramid fibers. The felt sheet 14 on the shaping surface 12a is of the same structure.

The press bending mold illustrated in FIGS. 3 and 4 can also be used to shape a heat-softened gob of glass between the female and male mold members 11, 12.

Figure 5:
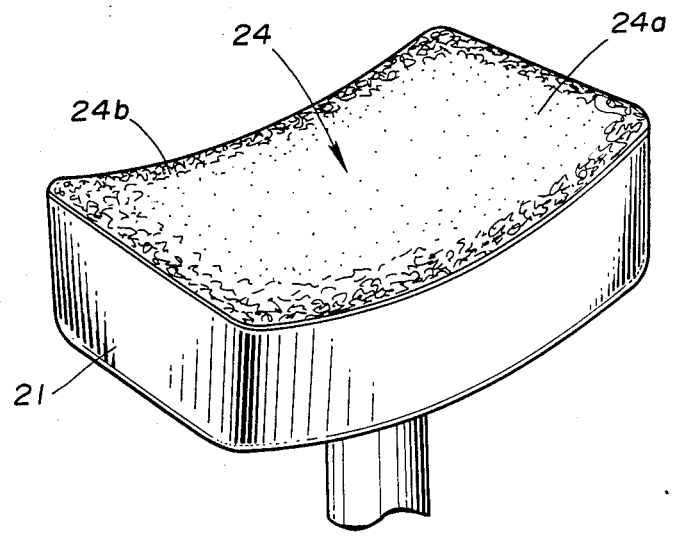
FIG. 5 is a perspective view of the female mold member of a glass shaping mold according to a third embodiment of the present invention.

FIG. 5 shows the female mold member 21 of a glass shaping mold according to a third embodiment of the present invention. A felt sheet 24 is applied entirely to the shaping surface of the female mold member 21. The felt sheet 24 is made of fibers 24a in a two-dimensionally central region and fibers 24b in a two-dimensionally peripheral edge region, the fibers 24a, 24b being different from each other. More specifically, the fibers 24b in the peripheral edge region may comprise highly mechanically strong fibers resistant to breakage, such as aramid fibers, steel fibers, or their mixture since the edge of the glass sheet G will engage the peripheral edge region of the felt sheet 24. The fibers 24a in the central region may comprise highly heat-resistant fibers such as carbon fibers, glass fibers, silica fibers, or the like, or a combination thereof.

With the arrangement of the present invention, the felt sheet which is of high heat resistance and mechanical strength is applied to the shaping surface of each of the female and male mold members. Therefore, no cloth marks will be imparted by the felt sheet to the surfaces of the shaped glass product, which remains free from optical defects such as light transmitting and reflecting distortions. The felt sheet itself is highly durable in use and could not be unraveled progressively from a broken region thereof, so that the felt sheet will be replaced less frequently. The thickness of the felt sheet can be selected as desired for an increased service life.

The felt sheet may be made of relatively short fibers rather than long fibers, and may comprise a mixture of two or more fiber types different in nature and combined at any desired ratio. Since the fiber mixture ratio can be varied in a localized region, differently mixed fibers can be used in felt sheet regions which require higher heat resistance or durability.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

I claim:
1. A glass shaping mold comprising:
a female mold member having a shaping surface;
a male mold member having a shaping surface complementary to said shaping surface of the female mold member;
a felt sheet made of at least two different materials, said materials comprising steel fibers and composite fibers including aramid fibers and carbon fibers, said felt sheet disposed on each of said shaping surfaces; and
said female and male mold members being movable toward each other to shape a heat-softened glass object between the felt sheets on said shaping surfaces.

2. A glass shaping mold according to claim 1, wherein said materials are arranged in layers across the thickness of said felt sheet.

3. A glass shaping mold according to claim 1, wherein said materials are arranged respectively in two-dimensionally central and peripheral edge regions of said felt sheet.

4. A glass shaping mold according to claim 1, wherein said felt sheet has a thickness ranging from 3 to 10 mm.

5. A glass shaping mold according to claim 1, wherein said felt sheet comprises fibers having a diameter ranging from 2 to 18 microns.

6. A glass shaping mold according to claim 5, wherein said diameter is approximately 10 microns.

7. A glass shaping mold comprising:
a female mold member having a shaping surface;
a male mold member having a shaping surface complementary to said shaping surface of the female mold member;
a felt sheet disposed on at least one of said shaping surfaces;
said felt sheet including at least two different fiber materials, comprising a first material having fibers of large mechanical strength and formed from the group consisting essentially of aramid fibers, steel fibers and mixtures thereof, and a second material having fibers of high heat resistance and formed from the group consisting essentially of carbon fibers, glass fibers, silica fibers and mixtures thereof, said female and male mold members being movable toward each other to shape a heat-softened glass object against the felt sheet on said at least one of said shaping surfaces.

8. A glass shaping mold as recited in claim 7 wherein said felt sheet comprises a layer formed of said two fiber materials, said layer including said first material of large mechanical strength along a two dimensional peripheral edge region thereof and said layer including said second material of high heat resistance in a central region thereof, substantially surrounded by said peripheral edge region of said first material.

9. A glass shaping mold as recited in claim 7 wherein each of said shaping surfaces has a felt sheet disposed thereon.

10. A glass shaping mold as recited in claim 9, wherein said felt sheet includes at least two layers, one layer formed of said first fiber material of large mechanical strength and a second layer formed of said second fiber material of high heat resistance, said second layer formed on a side of said first layer away from said shaping surface mounting said felt sheet and separated from said shaping surface by said first layer.

11. A glass shaping mold as recited in claim 10 wherein said felt sheet includes a core cloth layer between said first and second layers.

12. A glass shaping mold as recited in claim 11 further comprising another layer of said first material, said another layer of said first material disposed between said core cloth layer and said second layer.

13. A glass shaping mold as recited in claim 12 wherein said mold is a horizontal press bending mold.

14. A glass shaping mold comprising:
a female mold member having a shaping surface;
a male mold member having a shaping surface complementary to said shaping surface of the female mold member;
a felt sheet disposed on at least one of said shaping surfaces;
said felt sheet including at least first and second layers of heat resistant and mechanically strong fibers formed from the group consisting essentially of aramid fibers, carbon fibers, steel fibers, silica fibers, alumina fibers, asbestos fibers and combinations thereof and a cloth layer including fibers formed from the group consisting essentially of glass fibers, aramid fibers, carbon fibers, steel fibers, polyester fibers, nylon fibers, and combinations thereof, said first and second layers surrounding a core formed of said cloth layer;

said female and male mold members being movable toward each other to shape a heat-softened glass object against the felt sheet on said at least one of said shaping surfaces.

15. A glass shaping mold as recited in claim 14 wherein said fibers forming said first and second layers are intertwined with said fibers forming said cloth layer.

16. A glass shaping mold as recited in claim 14 wherein said core cloth layer is comprised of fibers from the group consisting essentially of aramid fibers and of a mixture of aramid and carbon fibers, and wherein said first and second layers are comprised of fibers.

17. A glass shaping mold as recited in claim 16 wherein said core cloth is formed of a mixture of aramid fibers and carbon fibers, and said aramid fibers are provided in the range of from 10 to 50 percent by weight of said core cloth and said carbon fibers are provided in the range of from 90 to 50 percent by weight of said core cloth.

18. A glass shaping mold as recited in claim 17 wherein said first and second layers are comprised of a mixture of steel fibers, aramid fibers and carbon fibers, said steel fibers being provided in the range from 50 to 80 percent by weight of said layer, said carbon fibers being provided in the range from 40 to 10 percent by weight of said layer, and said aramid fibers being provided in the range from 2 to 25 percent by weight of said layer.

19. A glass shaping mold as recited in claim 16 wherein said first and second layers are comprised of a mixture of steel fibers, aramid fibers and carbon fibers, said steel fibers being provided in the range from 50 to 80 percent by weight of said layer, said carbon fibers being provided in the range from 40 to 10 percent by weight of said layer, and said aramid fibers being provided in the range from 2 to 25 percent by weight of said layer.

20. A glass shaping mold as recited in claim 14 wherein the fibers forming said fiber layers have diameters ranging from 2 to 18 microns.

21. A glass shaping mold as recited in claim 14 wherein said felt sheet has a thickness in the range from 3 to 10 mm.

* * * * *